United States Patent [19]
Mort et al.

[11] Patent Number: 5,398,498
[45] Date of Patent: Mar. 21, 1995

[54] JOINT CONSTRUCTION BETWEEN COMPONENTS OF MILITARY PROJECTILE AND RELEASABLE BY MELTING OF FUSIBLE EUTECTIC HELICAL MEMBER

[75] Inventors: Raymond W. Mort, Hurst; James E. Goble, Bedford, both of Tex.

[73] Assignee: BEI Electronics, Inc., San Francisco, Calif.

[21] Appl. No.: 239,037

[22] Filed: May 6, 1994

[51] Int. Cl.$^6$ ............................................... F02K 1/16
[52] U.S. Cl. ......................................... 60/223; 60/253
[58] Field of Search ................ 60/39.1, 223, 253, 254; 220/89.4; 102/377, 481

[56] References Cited
U.S. PATENT DOCUMENTS

| | | | |
|---|---|---|---|
| H1,144 | 3/1993 | Cherry et al. | 60/39.1 |
| 4,602,480 | 7/1986 | Hill et al. | 60/253 |
| 4,738,100 | 4/1988 | Koorey | 60/253 |
| 5,036,658 | 8/1991 | Tate | 60/39.1 |
| 5,311,820 | 5/1994 | Ellingsen | 102/481 |

*Primary Examiner*—Timothy S. Thorpe
*Attorney, Agent, or Firm*—Palmatier & Zummer

[57] ABSTRACT

The joint construction is employed between a military rocket motor and a warhead adapted to be propelled by the motor. The motor includes a motor tube with a cylindrical front portion having an internal cylindrical surface therein. The warhead comprises an adapter ring having a cylindrical rear portion with an external cylindrical surface which is telescopically receivable within the internal cylindrical surface. The internal and external cylindrical surfaces are formed with respective confronting aligned internal and external helical screw thread grooves for receiving a fusible substantially helical joint member to form a secure connection between the rocket motor and the warhead. The helical joint member is made of a material having a low melting temperature, preferably a eutectic metal alloy, whereby the heat of a fire or the like will melt the joint member to disconnect the warhead from the rocket motor. The motor tube has a front wall with a vent opening therein, normally closed by a plug member. The adapter ring includes means for retaining the plug member in the vent opening. The melting of the fusible joint member is effective to release the retaining action of the adapter ring, whereby any pressure in the motor tube expels the plug member and the adapter ring from the motor tube.

14 Claims, 2 Drawing Sheets

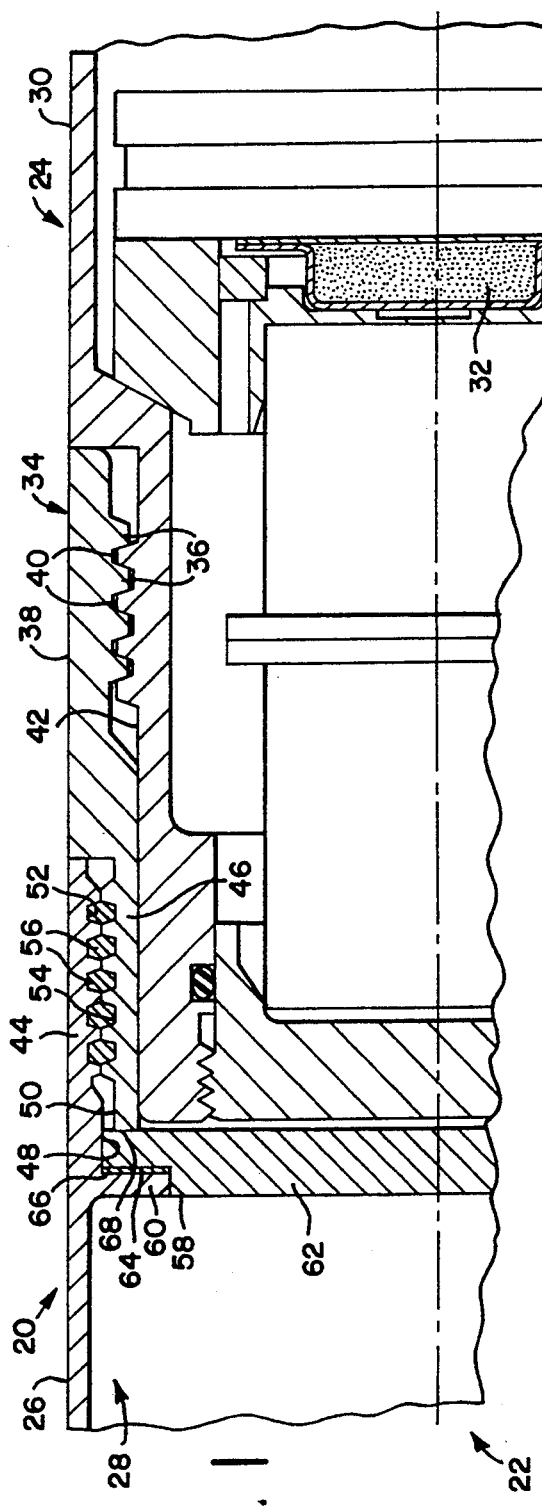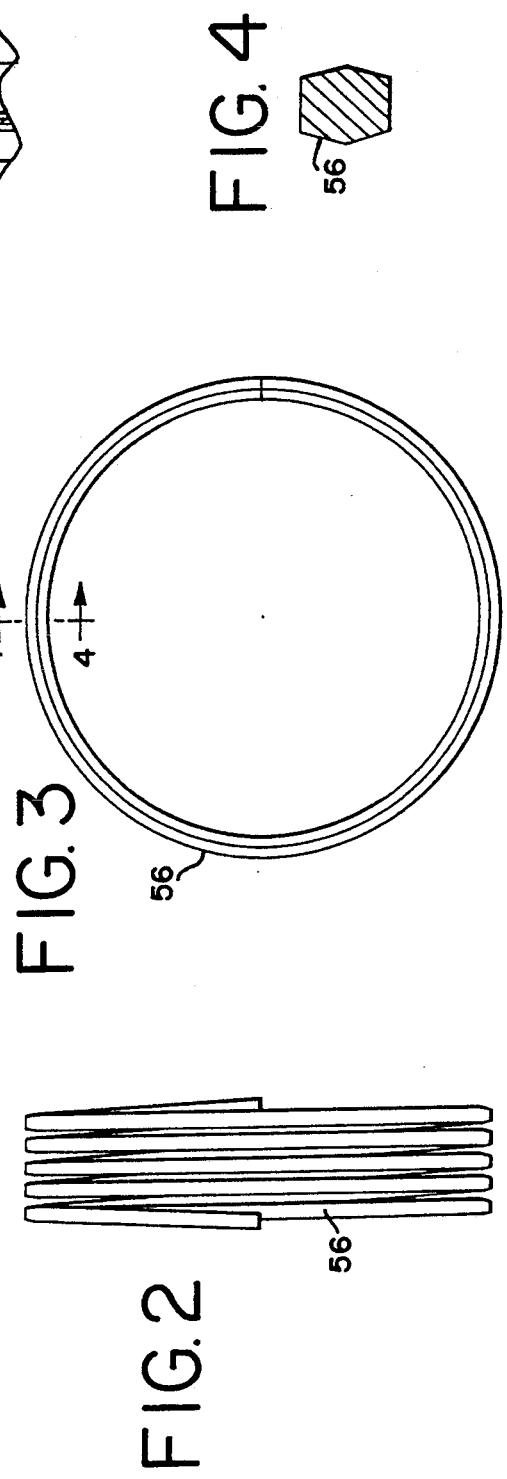

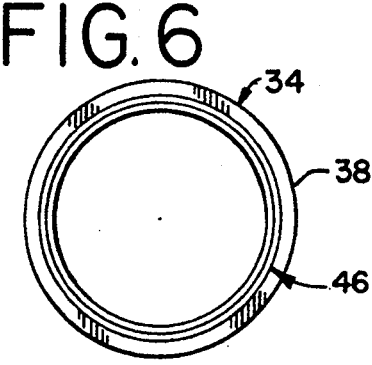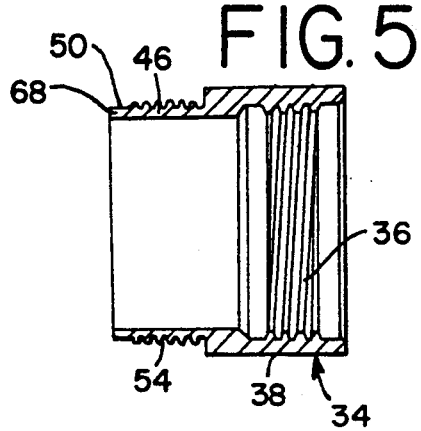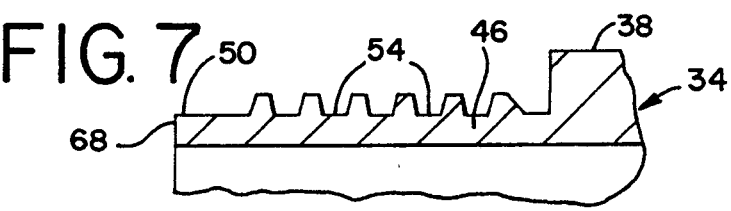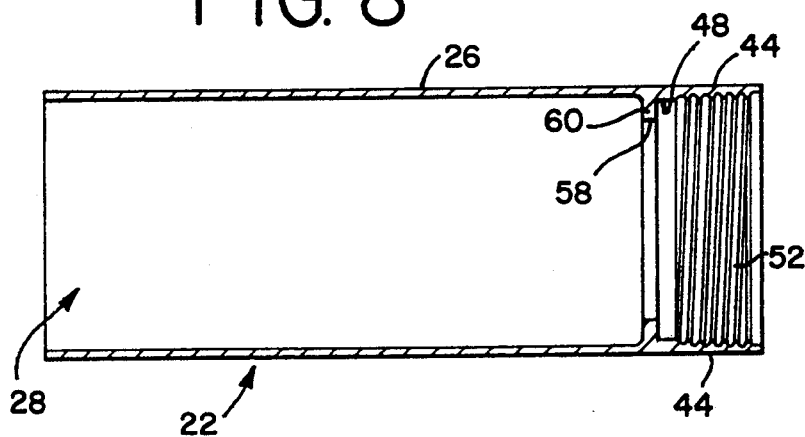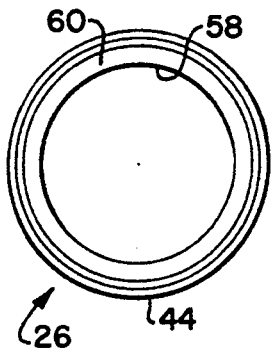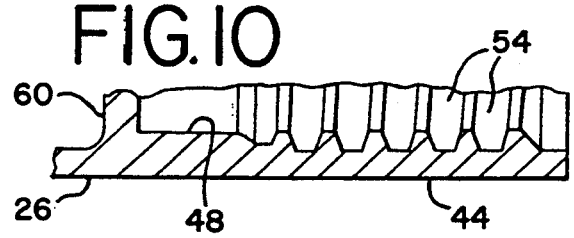

JOINT CONSTRUCTION BETWEEN COMPONENTS OF MILITARY PROJECTILE AND RELEASABLE BY MELTING OF FUSIBLE EUTECTIC HELICAL MEMBER

FIELD OF THE INVENTION

This invention relates generally to military ordnance projectiles and pertains particularly to a joint construction between a propulsion component and a warhead component, the joint construction being releasable by melting of a fusible eutectic helical member, whereby the propulsion component and the warhead component are disconnected by the heat of a fire or the like.

BACKGROUND OF THE INVENTION

Occasionally, military rocket-driven projectiles may be exposed to the heat of a fire which may become sufficiently intense to ignite the propulsion charge in the military propulsion rocket motor, whereby the warhead of the military projectile is propelled in an uncontrolled manner, with potentially disastrous results. To prevent any such disastrous results, a need exists to provide a releasable joint construction for use between a military rocket motor and its warhead whereby the heat of a fire causes disconnection of the joint between the military rocket motor and its warhead at a relatively low temperature, before the rocket motor is heated to a sufficiently high temperature to ignite the propellant charge therein. In many cases, the action of gravity will cause separation of the warhead from the rocket motor. In any event, the rocket motor should be constructed and arranged to cause immediate separation of the warhead from the rocket motor if the propellant charge is ignited by the heat of a fire or the like.

OBJECTS OF THE INVENTION

One object of the present invention is to provide a new and improved joint construction for use between a military rocket motor and its warhead, whereby the heat of a fire or the like will cause disconnection of the joint between the rocket motor and its warhead, before the rocket motor is heated to a sufficiently high temperature to cause ignition of the propellant charge therein.

A further object is to provide a new and improved joint construction of the foregoing character in which the joint is held together by a fusible member, preferably made of a eutectic metal alloy, which will melt at a low temperature so that the joint becomes disconnected before the rocket motor is heated to a sufficiently high temperature to ignite the propellant charge therein.

Another object of the present invention is to provide a new and improved joint construction of the foregoing character in which the fusible member is an indispensable component of the joint construction, whereby the joint is released when the fusible member is melted.

SUMMARY OF THE INVENTION

To achieve these objects, the present invention may provide a joint construction for use between a military rocket motor and a warhead adapted to be propelled by the motor, the joint construction comprising a generally cylindrical motor tube having a connection to the front end of the rocket motor and having a substantially cylindrical front component, a generally cylindrical casing having a connection to the rear end of the warhead, the casing having a substantially cylindrical rear component, the front and rear components having respective substantially cylindrical surfaces which are telescopically receivable one within the other, the cylindrical surfaces having confronting substantially helical screw thread grooves formed therein, and a fusible substantially helical joint member receivable in the screw thread grooves to form a secure connection between the components, the fusible substantially helical joint member being made of a material having a low melting temperature whereby the application of heat to the joint construction by a fire or the like will melt the joint member so as to disconnect the warhead from the rocket motor.

The joint member is preferably made of a metal material, which is preferably a substantially eutectic metal alloy having a low melting temperature.

The substantially cylindrical surface on the front component of the motor tube preferably takes the form of an internal cylindrical surface having one of the substantially helical screw thread grooves therein in the form of an internal screw thread groove. The substantially cylindrical surface on the rear component of the casing preferably is an external cylindrical surface which is telescopically receivable within the internal cylindrical surface. The substantially helical screw thread groove formed in the external cylindrical surface is preferably an external screw thread groove confronting the internal screw thread groove. The fusible substantially helical joint member is preferably receivable between the internal and external screw thread grooves to form a secure screw thread connection between the front and rear components.

The substantially helical joint member has at least one substantially helical coil, and preferably has a plurality of substantially helical coils.

The substantially cylindrical rear component of the casing on the warhead may take the form of a substantially cylindrical adapter ring having means thereon for securing the adapter ring to the casing.

The motor tube preferably has a front wall with a vent opening therein for receiving a plug member which has a portion for retention in a sealing relation with the front wall. The substantially cylindrical rear component on the warhead has means for retaining the plug member in the sealing relation with the front wall. The melting of the fusible joint member by the heat of a fire or the like is effective to release the retaining action of the rear component, whereby any pressure in the motor tube will expel the plug member and the rear component from the motor tube.

In another aspect, the present invention provides a joint construction for use between a military rocket motor and a warhead adapted to be propelled by the motor, the joint construction comprising a generally cylindrical motor tube having a connection to the front end of the rocket motor and having a front portion formed with an internal substantially cylindrical surface, a generally cylindrical member having a connection to the rear end of the warhead and having a reduced substantially cylindrical rear portion formed with an external substantially cylindrical surface which is telescopically receivable within the internal cylindrical surface, the internal and external substantially cylindrical surfaces having respective confronting aligned internal and external substantially helical screw thread grooves formed therein, and a fusible substantially helical joint member receivable in the screw thread grooves to form a secure connection between the motor tube and the cylindrical member on the warhead, the fusible substantially helical joint member being made of a material having a low melting temperature whereby the application of heat to the joint construction by a fire or the like will melt the joint member so as to disconnect the warhead from the rocket motor.

The joint member is preferably made of a metal material which is preferably a substantially eutectic metal alloy having a low melting temperature.

The motor tube preferably has a front wall with a vent opening therein for receiving a plug member for closing the vent opening. The plug member preferably has a portion for retention in a sealing relation with the front wall. The reduced substantially cylindrical rear portion of the cylindrical member preferably has means for retaining the plug member in a sealing relation with the front wall. The melting of the fusible joint member by the heat of a fire or the like is effective to release the retaining action of the rear portion, whereby any pressure in the motor tube will expel the plug member and the rear portion from the motor tube.

BRIEF DESCRIPTION OF DRAWINGS

Further objects, advantages and features of the present invention will appear from the following description, taken with the accompanying drawings, in which:

FIG. 1 is a fragmentary enlarged longitudinal section of a joint construction to be described as an illustrative embodiment of the present invention.

FIG. 2 is a side elevational view of a generally helical, fusible eutectic joint member employed in the joint construction of FIG. 1.

FIG. 3 is an end elevational view of the joint member of FIG. 2.

FIG. 4 is a fragmentary enlarged cross-sectional view taken through one of the coils of the joint member, generally along the section line 4—4 in FIG. 3.

FIG. 5 is a longitudinal section of a coupling or adapter ring employed in the joint construction of FIG. 1.

FIG. 6 is a left-hand end view of the ring shown in FIG. 5.

FIG. 7 is a fragmentary enlarged section corresponding with the upper left-hand portion of FIG. 5.

FIG. 8 is a longitudinal section of a generally cylindrical motor tube or casing constituting the extreme left-hand component of the assembly shown in FIG. 1.

FIG. 9 is a right-hand end view of the motor tube or casing shown in FIG. 8.

FIG. 10 is a greatly enlarged fragmentary section corresponding with the lower right-hand portion of FIG. 8, but on a considerably larger scale.

DETAILED DESCRIPTION OF AN ILLUSTRATIVE EMBODIMENT

As just indicated, FIG. 1 is a fragmentary enlarged section illustrating a joint construction 20 to be described as an illustrative embodiment of the present invention. The joint construction 20 is adapted to be employed between a military rocket motor 22 and its warhead 24, both of which are shown in a fragmentary manner in FIG. 1. The rocket motor 22 comprises a generally cylindrical motor tube or casing 26 having a chamber 28 therein for receiving a propellant charge, not shown, which, when ignited, is operative to propel the rocket motor 22 and the warhead 24. The warhead 24 comprises a casing 30 adapted to receive explosive weaponry, not shown, and an expulsion charge 32 for expelling the weaponry from the casing 30, when the expulsion charge 32 is detonated.

The illustrated joint construction 20 comprises a tubular component in the form of an annular, generally cylindrical adapter ring 34 which is removably secured to the warhead casing 30 by suitable means, illustrated as comprising internal screw threads 36 formed inside a substantially cylindrical end portion 38 of the adapter ring 34 and removably mated with external screw threads 40 on a reduced, substantially cylindrical portion 42 of the warhead casing 30.

The motor tube 26 and the adapter ring 34 are formed with substantially cylindrical, telescopically engageable end portions or members 44 and 46, one of which is adapted to be slidably received within the other. As illustrated in FIG. 1, the end portion 46 of the adapter ring 34 is reduced in diameter, relative to the opposite end portion 38 of the ring 34, and is telescopically receivable within the end portion 44 of the motor tube 26, although this relationship could be reversed. More specifically, the end portion 44 is formed with an internal substantially cylindrical surface 48 for slidably and telescopically receiving an external substantially cylindrical surface 50 on the end portion 46.

The telescopically related cylindrical surfaces 48 and 50 are formed with opposite confronting aligned screw thread grooves or channels 52 and 54. More specifically, the groove 52 is an internal screw thread groove formed in the internal cylindrical surface 48 in the motor tube 26. The groove 54 is an external screw thread groove formed in the external cylindrical surface 50 on the adapter ring 34. The screw thread grooves 52 and 54 are complementary in cross-sectional shape. As illustrated, the combined cross-sectional shape of the screw thread grooves 52 and 54 is hexagonal. The confronting screw thread grooves 52 and 54 are substantially helical in configuration.

In accordance with the present invention, the confronting screw thread grooves 52 and 54 are adapted to receive an easily fusible substantially helical joint member or insert 56 which is shown in cross section in FIG. 1 and separately in FIGS. 2 and 3. The helical joint member 56 is preferably made of a material having a low melting point or temperature so that the heat of a fire will be effective to melt the joint member 56. The joint member 56 comprises at least one generally helical coil and preferably a plurality of helical coils, as shown in FIG. 2.

The motor tube 26 and the adapter ring 34 are preferably made of a strong lightweight metal material, such as aluminum or an aluminum alloy, for example. The fusible helical joint member 56 is preferably made of a metallic material having a much lower melting point than the aluminum or aluminum alloy of which the motor tube 26 and the adapter ring 34 are preferably made. The helical joint member 56 is preferably made of a substantially eutectic metal alloy. By definition, an alloy is eutectic if the constituents of the alloy are proportioned to achieve the lowest possible melting point. Metals having low melting points are generally used in eutectic alloys. By way of example, the helical joint member or insert 56 may be made of a eutectic metal alloy having the following composition:

| | |
|---|---|
| Tin | 66.5% |
| Cadmium | 31.0% |

-continued

| | |
|---|---|
| Zinc | 2.5% |

The percentages refer to the weight of the constituents. This eutectic alloy has a melting temperature of approximately 325° F. (151.7° C.). The alloy is quite strong until it is heated to a temperature approaching the melting point. Other suitable eutectic alloys may be employed.

The assembly of the motor tube 26, the adapter ring 34 and the helical joint member 56 is easily carried out. The helical joint member 56 is sufficiently flexible and resilient to be easily assembled into the external helical groove 54 in the external cylindrical surface 50 of the adapter ring 34. Thus, the reduced end portion 46 of the adapter ring 34 can be screwed into the interior of the helical joint member 56. The outer portion of the helical joint member 56 then provides an external screw thread which can be easily screwed into the internal helical groove 52 in the end portion 44 of the motor tube 26. Thus, the motor tube 26 and the adapter ring 34 are assembled by screwing them together with the helical joint member 56 received between the internal screw thread groove 52 in the motor tube end portion 44 and the external screw thread groove 54 in the adapter ring end portion 46. The fusible eutectic helical joint member 56 is sufficiently strong to withstand the necessary tightening of the screw thread elements 48 and 50.

As shown in FIGS. 1 and 4, each helical coil of the helical joint member 56 is preferably hexagonal in cross section, although some other cross-sectional shape could be employed.

If the rocket motor 22 is ever subjected to excessive heat, which might be produced by a nearby fire or the like, the entire joint construction 20, including the fusible eutectic helical joint member 56, is gradually heated. If the joint construction 20 is heated to the relatively low melting temperature of the eutectic joint member 56, the joint member 56 is melted so that it becomes totally ineffective to hold the motor tube 26 and the adapter ring 34 together. Thus, the warhead 24 is disconnected from the rocket motor 22. The disconnection occurs before the propellant charge in the rocket motor 22 is ignited by the heat of the fire.

The illustrated rocket motor tube 26 has a front axial vent opening 58 formed in an inwardly projecting flange or front wall portion 60 of the motor tube 26. The vent opening 58 is normally closed by a plug 62 which is preferably made of aluminum or some other suitable material. As shown in FIG. 1, the plug 62 is formed with a front portion in the form of an outwardly projecting flange 64 which is opposite the front side of the flange or front wall portion 60 of the motor tube 26. To establish a sealing relation, a sealing gasket 66 is provided between the front wall 60 of the motor tube 26 and the flange 64 on the plug 62. The reduced end portion 46 of the adapter ring 34 has a rear end surface 68 which is engageable with the front side of the flange 64 on the plug 62 when the reduced end portion 46 of the adapter ring 34 is screwed fully into the front end portion 44 of the motor tube 26. In this way, the reduced end portion 46 of the adapter ring 34 clamps the flange portion 64 of the plug 62 against the gasket 66 so that the plug 62 effectively seals the front vent opening 58 in the motor tube 26.

If the rocket motor 22 is subjected to the heating action of a nearby fire, the fusible eutectic helical joint member 56 will be melted at a relatively low temperature, long before the rocket motor 22 is heated to a sufficiently high temperature to ignite the propellant charge therein. If the propellant charge is ignited, the hot gaseous products of combustion will produce a powerful forward pressure on the plug 62 whereby the plug 62, the adapter ring 34 and the warhead 24 will be expelled forwardly from the front portion 44 of the motor tube 26. The molten remnants of the joint member 56 do not afford any resistance to the expulsion of the adapter ring 34 from the front portion 44 of the motor tube 26.

Thus, the warhead 24 is separated from the motor tube 26 and is not propelled by the rocket motor 22. Moreover, the hot gaseous products of combustion which escape forwardly through the vent opening 58 will largely counterbalance the propellant effect of the hot gaseous products of combustion discharged rearwardly from the rocket motor 22, so that the forward propulsive force normally developed by the rocket motor 22 is largely counterbalanced. In any event, the rocket motor 22 will not propel the warhead 24 after it has been separated from the rocket motor 22 by the initial escape of the hot gases through the front vent opening 58.

The joint construction 20 is easy to assemble and low in cost. The fusible joint member 56 affords a secure connection between the rocket motor 22 and the warhead 24. If the fusible joint member 56 is melted by the heat of a fire or the like, the warhead 24 is immediately and completely disconnected from the rocket motor 22.

Various other modifications, alternative constructions and equivalents may be employed without departing from the true spirit and scope of the present invention, as disclosed in this application and as defined in the following claims.

We claim:

1. A joint construction for use between a military rocket motor and a warhead adapted to be propelled by combustion of a propellent in said motor, said joint construction comprising
    a generally cylindrical motor tube having a connection to the front end of said rocket motor,
    said motor tube having a substantially cylindrical front component,
    a generally cylindrical adapter ring having means thereon for securing said adapter ring to said warhead,
    said adapter ring having a substantially cylindrical rear component,
    said components having respective substantially cylindrical surfaces which are telescopically receivable one within the other,
    said cylindrical surfaces having confronting aligned substantially helical screw thread grooves formed therein,
    and a fusible substantially helical joint member receivable in said screw thread grooves to form a secure connection between said components,
    said fusible substantially helical joint member being made of a metal alloy having a melting temperature greater than that normally encountered during operation but less than the autoignition temperature of the propellant whereby the application of heat to said joint construction by a fire or the like will melt said joint member so as to disconnect said warhead from said rocket motor.

2. A joint construction according to claim 1, in which said joint member is made of a substantially eutectic metal alloy.

3. A joint construction according to claim 1,
in which said substantially cylindrical surface on said front component of said motor tube takes the form of an internal cylindrical surface having one of said substantially helical screw thread grooves therein in the form of an internal screw thread groove,
said substantially cylindrical surface on said rear component of said adapter ring being an external cylindrical surface which is telescopically receivable within said internal cylindrical surface,
said substantially helical screw thread groove formed in said external cylindrical surface being an external screw thread groove confronting said internal screw thread groove,
said fusible substantially helical joint member being receivable between said internal and external screw thread grooves to form a secure screw thread connection between said front and rear components.

4. A joint construction according to claim 3,
in which said joint member is made of a substantially eutectic metal alloy.

5. A joint construction for use between a military rocket motor and a warhead adapted to be propelled by combustion of a propellent in said motor, said joint construction comprising
a generally cylindrical motor tube having a connection to the front end of said rocket motor,
said motor tube having a substantially cylindrical front component,
a generally cylindrical casing having a connection to the rear end of said warhead,
said casing having a substantially cylindrical rear component,
said components having respective substantially cylindrical surfaces which are telescopically receivable one within the other,
said cylindrical surfaces having confronting substantially helical screw thread grooves formed therein,
and a fusible substantially helical joint member receivable in said screw thread grooves to form a secure connection between said components,
said fusible substantially helical joint member being made of a metal alloy having a melting temperature greater than that normally encountered during operation but less than the autoignition temperature of the propellent whereby the application of heat to said joint construction by a fire or the like will melt said joint member so as to disconnect said warhead from said rocket motor.

6. A joint construction according to claim 5,
in which said joint member is made of a substantially eutectic metal alloy.

7. A joint construction according to claim 5,
in which said substantially cylindrical surface on said front component of said motor tube takes the form of an internal cylindrical surface having one of said substantially helical screw thread grooves therein in the form of an internal screw thread groove,
said substantially cylindrical surface on said rear component of said casing being an external cylindrical surface which is telescopically receivable within said internal cylindrical surface,
said substantially helical screw thread groove formed in said external cylindrical surface being an external screw thread groove confronting said internal screw thread groove,
said fusible substantially helical joint member being receivable between said internal and external screw thread grooves to form a secure screw thread connection between said front and rear components.

8. A joint construction according to claim 7,
in which said joint member is made of a substantially eutectic metal alloy.

9. A joint construction according to claim 7,
in which said substantially helical joint member has a plurality of substantially helical turns.

10. A joint construction for use between a military rocket motor and a warhead adapted to be propelled by combustion of a propellent in said motor, said joint construction comprising
a generally cylindrical motor tube having a connection to the front end of said rocket motor,
said motor tube having a front portion formed with an internal substantially cylindrical surface,
a generally cylindrical member having a connection to the rear end of said warhead,
said generally cylindrical member having a reduced substantially cylindrical rear portion formed with an external substantially cylindrical surface which is telescopically receivable within said internal cylindrical surface,
said internal and external substantially cylindrical surfaces having respective confronting internal and external substantially helical screw thread grooves formed therein,
and a fusible substantially helical joint member receivable in said screw thread grooves to form a secure connection between said motor tube and said cylindrical member on said warhead,
said fusible substantially helical joint member being made of a metal alloy having a melting temperature greater than that normally encountered during operation but less than the autoignition temperature of the propellent whereby the application of heat to said joint construction by a fire or the like will melt said joint member so as to disconnect said warhead from said rocket motor.

11. A joint construction according to claim 10,
in which said joint member is made of a substantially eutectic metal alloy.

12. A joint construction according to claim 1,
in which said motor tube has a front wall with a vent opening therein,
a plug member for closing said vent opening,
said plug member having a portion for retention in a sealing relation with said front wall,
said substantially cylindrical rear component of said adapter ring having means for retaining said plug member in a sealing relation with said front wall,
the melting of said fusible joint member by the heat of a fire or the like being effective to release the retaining action of said rear component of said adapter ring,
whereby any pressure in said motor tube will expel said plug member and said adapter ring from said motor tube.

13. A joint construction according to claim 5, in which said motor tube has a front wall with a vent opening therein,
a plug member for closing said vent opening,
said plug member having a portion for retention in a sealing relation with said front wall, said substantially cylindrical rear component having means for retaining said plug member in a sealing relation with said front wall, the melting of said fusible joint member by the heat of a fire or the like being effective to release the retaining action of said rear component, whereby any pressure in said motor tube will expel said plug member and said rear component from said motor tube.

14. A joint construction according to claim 10, in which said motor tube has a front wall with a vent opening therein, a plug member for closing said vent opening, said plug member having a portion for retention in a sealing relation with said front wall, said rear portion having means for retaining said plug member in a sealing relation with said front wall, the melting of said fusible joint member by the heat of a fire or the like being effective to release the retaining action of said rear member, whereby any pressure in said motor tube will expel said plug member and said rear member from said motor tube.

* * * * *